United States Patent
Kote et al.

(10) Patent No.: US 12,337,873 B2
(45) Date of Patent: Jun. 24, 2025

(54) RECOVERY AND RETRIEVAL SYSTEM FOR AN AUTONOMOUS VEHICLE FLEET

(71) Applicant: GM Cruise Holdings LLC, San Francisco, CA (US)

(72) Inventors: Disha Kote, Milpitas, CA (US); John Deniston, Colorado Springs, CO (US); Tyler Straker, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 289 days.

(21) Appl. No.: 18/053,119

(22) Filed: Nov. 7, 2022

(65) Prior Publication Data

US 2024/0149916 A1    May 9, 2024

(51) Int. Cl.
*B60W 60/00* (2020.01)
*B60W 50/029* (2012.01)
*G07C 5/00* (2006.01)

(52) U.S. Cl.
CPC ...... *B60W 60/0018* (2020.02); *B60W 50/029* (2013.01); *G07C 5/008* (2013.01); *B60W 2050/0292* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 2017/0080900 A1* | 3/2017 | Huennekens | G05D 1/0088 |
| 2017/0261991 A1* | 9/2017 | Raghu | B60W 30/00 |
| 2018/0365908 A1* | 12/2018 | Liu | G05D 1/227 |
| 2019/0235487 A1* | 8/2019 | Zhao | H04W 4/44 |
| 2021/0114614 A1* | 4/2021 | Weslosky | G06F 11/0793 |
| 2021/0116256 A1* | 4/2021 | Konrardy | G06Q 50/265 |
| 2022/0108281 A1* | 4/2022 | Higashide | G07C 5/008 |

* cited by examiner

*Primary Examiner* — Christian Chace
*Assistant Examiner* — Shayne M. Gilbertson
(74) *Attorney, Agent, or Firm* — Honigman LLP; Matthew H. Szalach; Jonathan P. O'Brien

(57) ABSTRACT

Systems and methods enable an autonomous vehicle (AV) to self-recover or be remotely recovered if the AV is rendered immobilized, without requiring in-person retrieval or tow of the AV. Upon the occurrence of a non-nominal event, the AV performs a dynamic driving task fallback maneuver to achieve a minimal risk condition and secures its cabin. Based on the type and severity of the event, residual AV health, and passenger confirmation, escalating grades of recovery or retrieval are executed as needed to recover from the event and resume operation. Multiple AVs can be monitored simultaneously and addressed based on priority of AV state and recovery/retrieval state, resulting in more efficient fleet management.

14 Claims, 5 Drawing Sheets

RECOVERY AND RETRIEVAL SYSTEM FOR AN AUTONOMOUS VEHICLE FLEET

FIELD OF THE DISCLOSURE

The present disclosure relates generally to autonomous vehicles (AVs) and to systems and methods for recovery and retrieval.

BACKGROUND

An autonomous vehicle (AV) is a vehicle capable of operating and navigating without a human driver. To this end, AVs include sensor systems such as cameras, lidar, radar, global positioning, and the like that monitor surroundings, as well sensor systems such as wheel encoders, tire pressure, door position, and the like that monitor current statuses of the vehicle. Onboard computers control the AV (e.g., braking, acceleration, turning) based on inputs from these sensor systems and other control commands. A fleet of AVs may be used to provide passenger pick-up and delivery services. When several AVs are dispatched, they may service a wide geographic area. The AV may be rendered inoperable or become stuck while in-service or multiple AVs might encounter the same or similar failure simultaneously. Attending to each AV in-person when this occurs can present various challenges and is costly.

SUMMARY

Systems and methods are provided for autonomous vehicles (AV) to self-recover or be remotely recovered if the AV is rendered immobilized, without requiring in-person retrieval or tow of the AV. In some examples, based on the type and severity of the event, residual AV health, and passenger confirmation, escalating grades of recovery or retrieval are executed as needed to recover any stranded AVs from the event and resume operation. Multiple AVs can be monitored simultaneously and addressed based on severity of the event, traffic impedance caused by the AV, state of the AV and recovery/retrieval state, resulting in more efficient fleet management.

According to one aspect, an autonomous vehicle (AV) recovery or retrieval method comprises: transmitting information related to a status and surrounding of the AV to a remote operations center; identifying the occurrence of a triggering event that immobilizes the AV based on the transmitted information; comparing the transmitted information to predetermined response criteria—which involves resolution of the underlying failure mode that immobilized the AV; based on the comparison, determining whether to initiate a self-recovery process of the AV by the AV or to perform a remote recovery process of the AV by the remote operations center; executing the self-recovery process or the remote recovery process based on the determination; confirming successful recovery of the AV either by the AV itself or the remote operations center; and resuming operation of the AV.

According to another aspect, an autonomous vehicle (AV) recovery or retrieval system comprises: at least one AV; a sensor associated with the at least one AV and configured to collect information related to a status and surrounding of the AV; and a remote operations center comprising at least one processor and memory operated by a remote operator in communication with the autonomous vehicle, wherein the AV is configured to transmit the information related to the status or the surrounding of the AV from the sensor to the remote operations center, wherein the remote operations center is configured to: identify the occurrence of a triggering event that immobilizes the AV based on the transmitted information; compare the transmitted information to predetermined response criteria; based on the comparison, determine whether to perform a remote recovery process of the at least one AV (or multiple AVs simultaneously); and acknowledge successful recovery of the AV following execution of the self-recovery process or the remote recovery process, wherein when the remote operations center determines to perform the remote recovery process, the remote operations center is further configured to execute the remote recovery process to resolve the failure mode that immobilized the AV. Alternatively, the remote operations center can be involved in the self-recovery of the AV, wherein when the remote operations center determines to initiate the self-recovery process, the remote operations center is configured to instruct the AV to execute the self-recovery process, and the AV is further configured to execute the self-recovery process.

According to another aspect, an autonomous vehicle (AV) recovery or retrieval method comprises: receiving information related to a status or a surrounding of an AV from the AV; identifying the occurrence of a triggering event that immobilizes the AV based on the transmitted information; comparing the transmitted information to predetermined response criteria; based on the comparison, instructing the AV to initiate a self-recovery process; and confirming successful recovery of the AV based on an automated safety and operational check of the AV.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
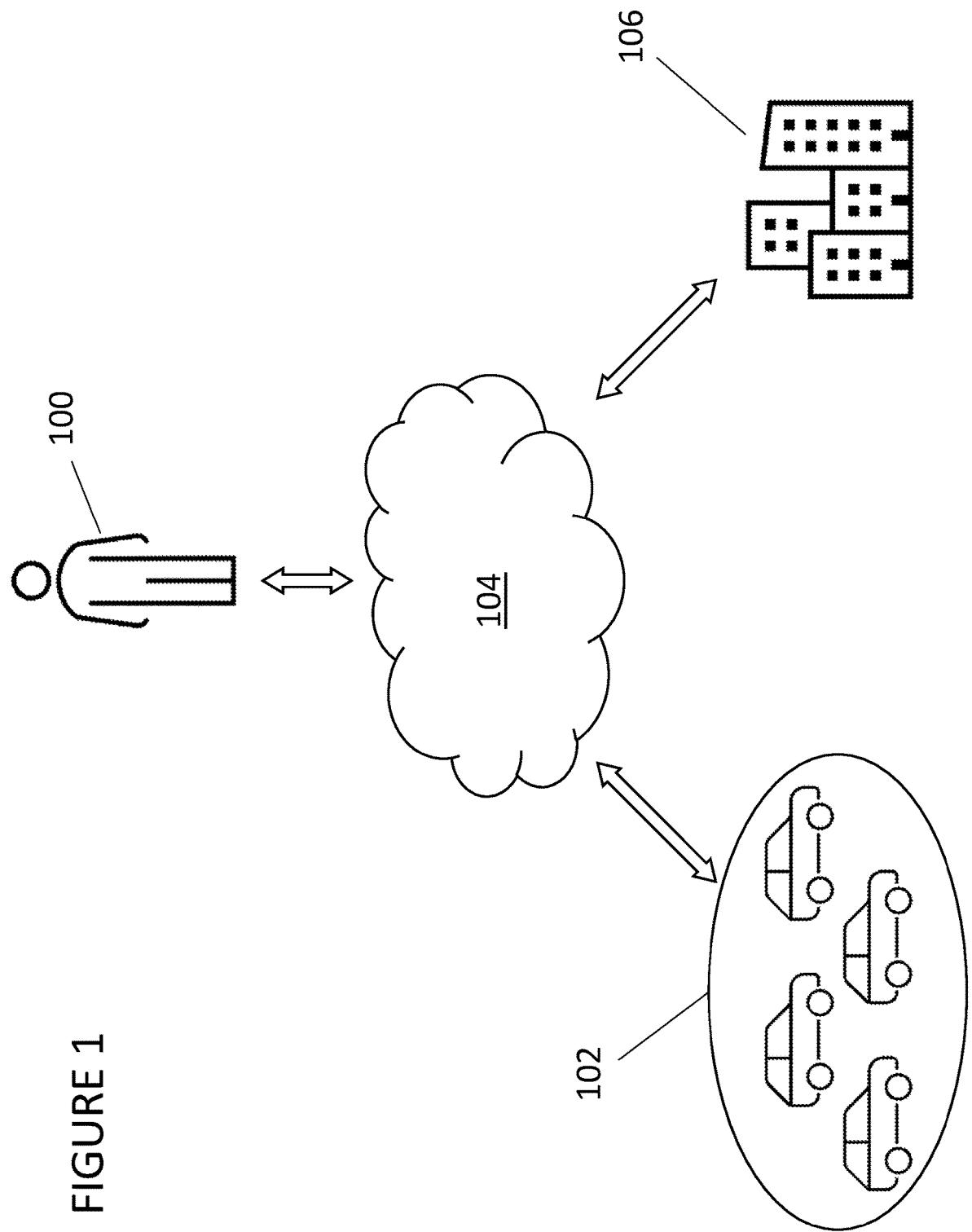
FIG. 1 illustrates an example AV fleet and remote operations monitoring architecture in accordance with some aspects of the present technology.

Currently, where AV systems lack an ability to remotely understand an event that causes the driverless AV to become inoperable, a worst-case scenario is presumed, and a tow is requested to remove the AV. Even where human operators can manually monitor AVs (e.g., by checking outputs of the sensor systems to ensure acceptable operation) and determine whether a repair is necessary, this can be a time consuming and error-prone process especially for large fleet sizes (in terms of both number of vehicles and span of geographic area). Further, tows or other unnecessary removals of AVs to garages can become expensive and disrupt service.

Early projections indicate towing requirements could cost millions each year as well as meaningfully degrade the customers' experience. Having many stuck AVs waiting to be towed and/or congesting city streets may also impact relations with local government officials. Thus, having a safe, timesaving, scalable solution to recover AVs after detecting incidences would be worthwhile.

In view of the above, systems and methods are provided herein that enable an AV operations team to remotely determine, in real time, if a driverless AV is self-recoverable, recoverable via remote operation, or if instead, the AV must be retrieved such as by towing. Without such systems and methods that enable an AV operations team to remotely understand why a vehicle has become stuck, and where possible, remotely recover, or resolve the problem or allow the AV to self-recover, every stuck vehicle would have to be treated as a worst-case scenario, or as unrecoverable, and require either in-person attention for resolution or be towed away due to no other available resolution.

In particular, when a non-nominal event occurs in a driverless AV that triggers an alert, the systems and methods provided herein facilitate remotely understanding the cause of the triggering event and if possible, remotely recovering from the event or allowing the AV to self-recover and resume regular operation. This minimizes demand for on-site retrieval after every reported or detected incident and maximizes AV operational uptime. Further, when multiple AVs experience a similar or the same failure simultaneously that result in their immobilization, they can be recovered without requiring human intervention.

Recovery of an AV is defined as a process of safely resuming AV operation after an incident has occurred without in-person intervention. Retrieval is defined as a process of enabling in-person AV intervention from the field. Examples of in-person intervention range from manually assisting the AV in the field to resolve the error to an in-person rescue which involves a tow or physical retrieval of the AV, which removes it from the field and returns it to a garage for further attention.

In some implementations of the systems and methods, different levels of recoverability can be provided. For example, the different levels may include one or more of the following: relocation, self-recovery, remote recovery, in-person recovery, in-person retrieval and tow retrieval. Relocation means that the AV is capable of being remotely limped to a safe location such as out of traffic lanes to minimize traffic impedance and reduce risk during subsequent recovery and/or retrieval levels.

Recovery can involve self-recovery and remote recovery. Self-recovery means that the AV is capable of self-healing from the incident or non-nominal event and resumes operation upon a successful automated safety and operational check performed by the AV or alternatively upon receiving remote operator confirmation. With remote recovery, remote operations personnel communicate with the AV through its onboard computer, evaluate its data, and can resolve the incident through remote communications with the AV.

In-person recovery involves operations personnel to travel to the AV, determine and then resolve the issue on-site (in the driverless AV). The AV is able to resume operation— such as continuing on to its scheduled destination.

For in-person retrieval, operations personnel also arrive on-site to the driverless AV but because of various reasons, cannot resolve the issue. However, the AV is in drivable condition and thus, the operations personnel rescues the AV and manually drives it back to a fleet garage for further repair. With tow retrieval, the AV achieves a stationary and secure state and waits for tow truck retrieval. Tow retrieval can indicate that the AV is not in a drivable state. The tow truck delivers the AV to the fleet garage or some other designated facility.

In some implementations, the systems and methods as described herein permit the driverless AV to assess its recoverability based on various parameters including, but not limited to, type and severity of the non-nominal event, residual AV health, and/or rider confirmation (if a rider is present). Further, the systems are capable of escalating to one or more different levels of recoverability based on the AV's and operations personnel's assessment of the non-nominal event details and/or affected systems of the onboard computer.

Example AV Rideshare System with Recovery and Retrieval System

An example AV rideshare system architecture is illustrated in FIG. 1. A passenger 100 may request a ride of an AV in fleet 102, for example, via a ridesharing app on a personal computing device. The ridesharing app may communicate directly with AVs in the fleet 102 via network 104, or through a remote operations center 106 that manages the fleet 102. The passenger is then paired with an AV based on parameters including but not limited to passenger's pickup location, AV location, passenger's requested drop-off location, and traffic and road conditions (e.g., construction, closures, detours, reported obstacles or other delays) in an area proximal to the passenger's pickup location and drop-off location.

The selected AV is identified to the passenger 100, travels to the passenger's location, picks up the passenger 100, and takes the passenger 100 to their requested destination. Operation of all the AVs in the fleet may be remotely monitored by operators at the remote operations center 106. The remote operations center 106 can have one or more computers (e.g., comprising memory, processors, and the like) operated by a remote operator, and is able to able communicate with each AV and, using the various onboard cameras on each AV, can receive live, real time video data from inside and outside of the AV. The video data may correlate with other data communicated from the AV's onboard computer, which can provide a richer understanding of the AV's present status.

The remote operations center 106 may request status information from one or more AVs at or about the same time. The information may include operational or sensor data from each AV's onboard computer system as well as other information regarding the environment and surroundings of the AV such as vehicle traffic, pedestrian traffic, weather conditions, and road conditions.

By its own relay schedule, the AV may regularly transmit vehicle status information and/or information relating to the AV's surroundings to the remote operations center 106 during its operation in the field including when idle (e.g., parked or waiting for a ride request) or when in motion. For example, every W seconds (where W is greater than 0 seconds), each AV in the field may communicate one or more set of indicators to the remote operations center 106 to relay its status at that time.

While operating in the field, the driverless AV may experience a non-nominal event that results in a failure state of the AV, ranging from self-recoverable in the field to irreparable in the field. Such events may include, for example, transient conditions or faults, part malfunctions, collisions, tampering with the AV, public interference with the AV, passenger stop requests, unsuccessful pickup/drop off, traffic stops, and the like.

Example Recovery and Retrieval Process for AVs

Figure 2:
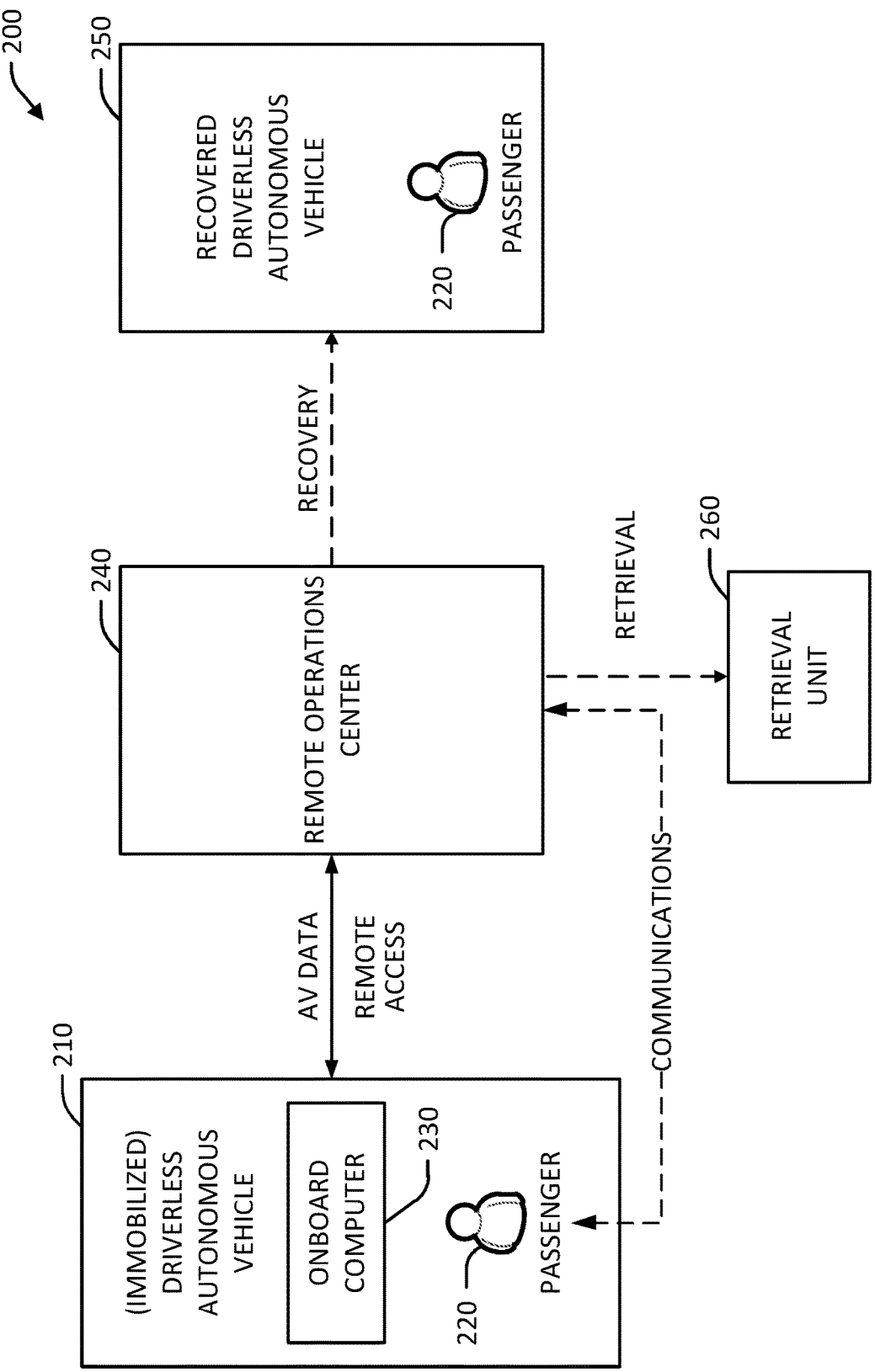
FIG. 2 illustrates an example schematic diagram of an example recovery and retrieval process in accordance with some aspects of the present technology.

FIG. 2 depicts a schematic diagram of an example recovery and retrieval process 200 when a driverless AV 210 having an optional passenger 220 onboard experiences a triggering event (e.g., a non-nominal event). Due to the triggering event, the AV safely stops and becomes immobilized, as it cannot continue the ride until the error is resolved and the AV is cleared to proceed with the ride. The AV 210 is deemed "stuck" at this point. Some AVs that are deemed stuck may have a passenger while others may not. As further discussed below, when a passenger is present in the AV, they may provide input or feedback which is communicated to the AV onboard system or to the remote operations center, depending on the recovery mode.

AV data is communicated to and from the stuck AV's onboard computer 230 to and from the remote operations center 240. The data communicated to the remote operations center 240 can include information about the triggering event, status readings from various sensors and AV controls. At a minimum, the transmitted data identifies that the AV is presently stuck and any other data that relates to the triggering event.

The remote operations center 240 can remotely access the AV's onboard computer 230 and for some triggering events, can adjust or reset as needed certain AV controls via the onboard computer 230 as well as determine based on the collected data that it is safe for the AV to resume the ride. This allows for a successful remote recovery of the AV and the recovered AV 250 can proceed to the passenger's destination or to a destination to pick up a passenger.

In some cases, however, the triggering event cannot be remotely resolved. When this happens and the AV is deemed manually drivable, the remote operations center 240 communicates with a retrieval unit 260. The retrieval unit 260 sends out personnel to retrieve the AV and drive it to a repair site. It may also communicate with the passenger 220 to end the ride and optionally schedule a new ride from a suitable location. If the AV's location is not suitable for the passenger to exit the vehicle, the passenger can exit once a suitable location is reached.

If the AV is not drivable, then the retrieval unit 260 calls for a tow of the AV. Again, the remote operations center 240 is in communication with the passenger 220 to keep them informed and to provide available options.

As described, the recovery and retrieval process 200 allows for a remote operator and the AV to assess the triggering event and its impact to the AV's robotic systems and manage (and monitor) its recovery, particularly when other parties may be involved such as first responders, the passenger(s), and other users of the road. This process can be carried for multiple AVs in the field in a simultaneous manner. The ability to remotely monitor the data and progress of resolution for multiple AVs simultaneously allows the remote operators to prioritize and/or escalate the recovery/retrieval process based on the severity of the event, condition of the AV and if first responders are involved. Consequently, managing a fleet of AVs becomes more efficient overall.

Example Levels of AV Recovery and Retrieval

Figure 3:
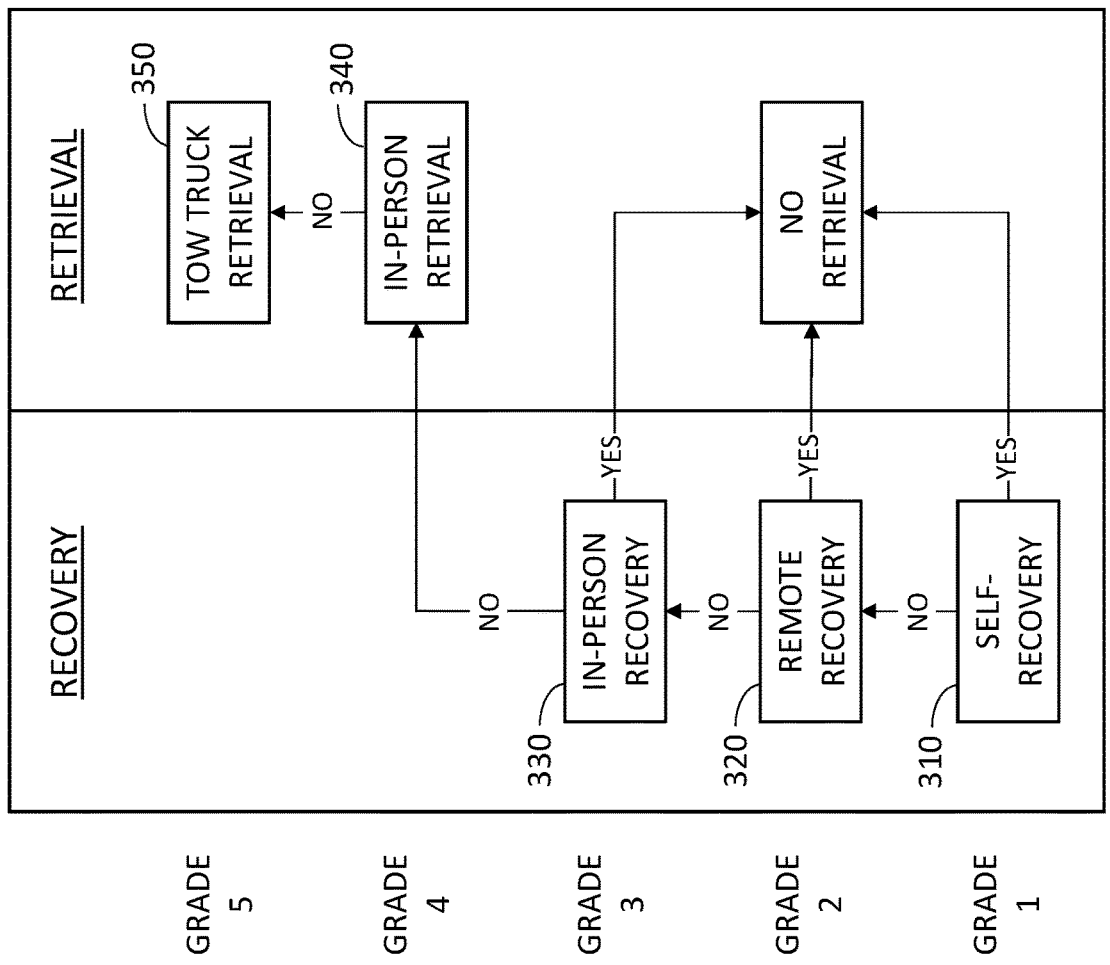
FIG. 3 illustrates example resolution grades for different forms of recovery and retrieval in accordance with some aspects of the present technology.

FIG. 3 illustrates resolution grades for escalating forms of recovery and retrieval of the AV. The lowest response level (grade 1) involves self-recovery 310, in which the AV can recover from the triggering event on its own without remote or manual intervention. The AV can resume operation such as by performing an automated self-safety and operations check. In this situation, the remote operations center (e.g., a remote operator) is not involved in the remote recovery process and is not required to confirm self-recovery or otherwise intervene in the remote recovery. Alternatively, however, it is possible for the remote operator to confirm or validate a self-recovery of the AV if desired. For example, before resuming the ride, the AV may receive remote operator confirmation from the remote operations center (106, 240).

If self-recovery is successful, then the AV resumes operation and no other intervention is necessary. However, if self-recovery is unsuccessful, remote recovery 320 (grade 2) may be attempted, in which an operator at the remote operations center (106, 240) remotely troubleshoots the triggering event and provides remote assistance to the AV via the network (104) to eventually resume operation.

During remote recovery 320, the remote operations center (106, 240) can operate the doors of the AV (e.g., if left open by a passenger or unexpectedly opened by a pedestrian), lock/unlock doors of the AV, turn on lights (e.g., interior cabin lights, hazard lights, head lights), honk the horn, adjust the cabin temperature, activate windshield wipers, defog windows, and make other adjustments to other computerized features. Thus, during remote recovery or at any other given time, the AV can be secured. It can also determine true positive events by assessing AV data (e.g., confirming a collision) and allow remote recovery for false positive detections. It can also communicate with the passenger, if present, to resolve the issue.

If remote recovery is successful, the AV returns to regular operation. However, if remote recovery is unsuccessful, the process is escalated to in-person recovery 330 (grade 3). In-person recovery involves an operator arriving on-site at the AV location to troubleshoot and resolve the event in person so that the AV may resume operation.

In the event the preceding recovery operation is unsuccessful, and the AV cannot resume operation, the systems and methods herein may initiate retrieval responses. In-person retrieval 340 (grade 4) also involves an operator arriving on-site to the AV's location and manually driving the AV to another site (e.g., a repair garage). Alternatively, or if in-person retrieval is not successful or not available, the highest response level involves dispatching a tow truck 350 (grade 5) to retrieve the AV. In some instances, the remote operations center or the AV itself may immobilize the AV while awaiting retrieval if, for example, it is unsafe for the AV to move.

Data regarding the triggering event and the state of the AV may cause the systems and method herein to go immediately to a retrieval grade rather than start with grades 1 through 3, for example, when a collision is the triggering event. Therefore, the recovery and retrieval systems described herein assess the triggering event and either take a progressive approach or escalate to a retrieval grade based on one or more of the following: the severity of the event, AV location, type of incident, and involvement of first responders.

Throughout the recovery and retrieval processes, the AV and remote operations center may perform self-diagnostics. For example, it can be determined whether a remote operator is unavailable, or there is a loss of communication between the AV and the remote operations center.

Example AV Recovery and Retrieval Process

Figure 4:
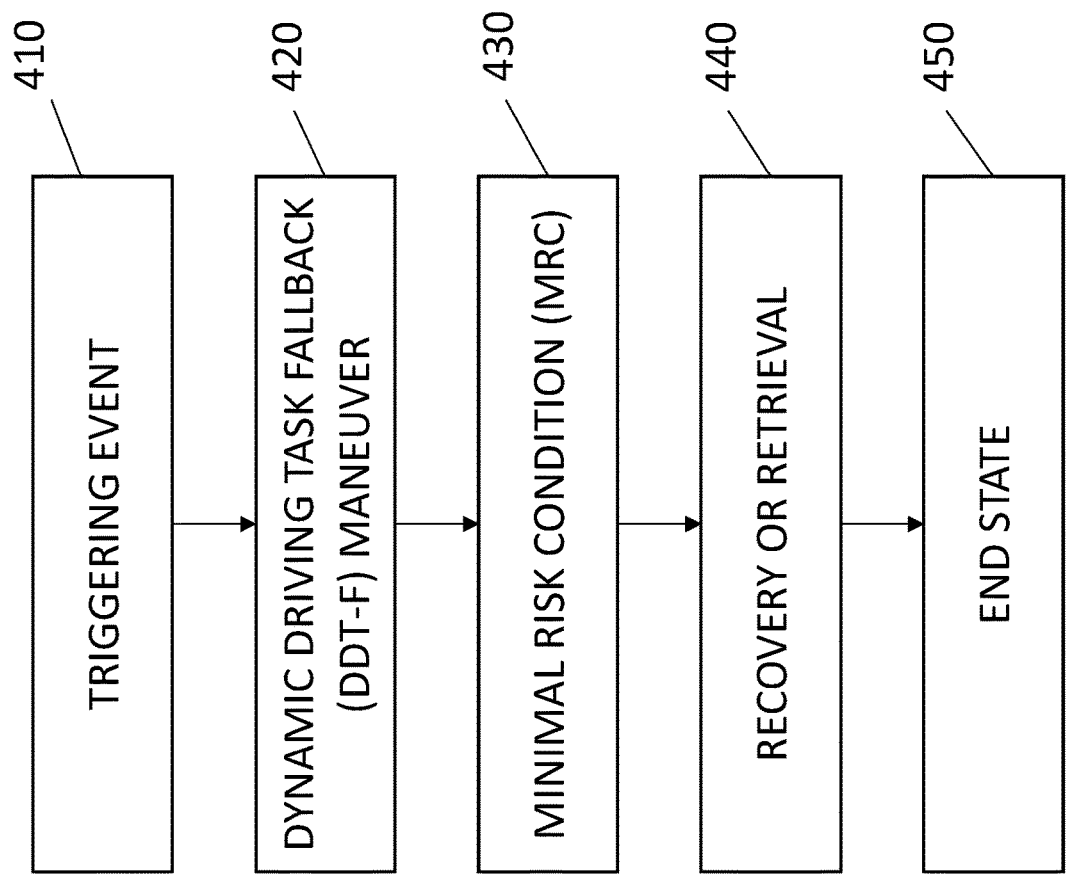
FIG. 4 is an example event resolution procedure in accordance with some aspects of the present technology.

Referring to FIG. 4, an example recovery and retrieval process 400 is described that is scalable to manage and assess multiple AVs at the same time. At 410, a triggering event occurs while the AV is in use (e.g., dispatched in the field). The AV may be at a stop or in motion when the triggering event occurs. For instance, the triggering event might be an object detected on the road (e.g., an animal walking in the road). In response to the triggering event, the driverless AV performs a "dynamic driving task fallback (DDT-F)" maneuver at 420. Examples of the dynamic driving task fallback include but are not limited to an immediate pullover of the AV, a safe stop of the AV or similar action by the AV that achieves a "minimal risk condition" (MRC) or safe state of the AV at 430. In the above instance, the AV safely stops in the road in response to seeing the object in its path.

Once the safe state of the AV is achieved, the AV itself and/or remote operations center (106, 240) execute a recovery or retrieval process for the AV at 440 to resolve the triggering event and reach an end state at 450. The stoppage of the AV may also be communicated to the remote operations center. An operator can review the data (triggering event, AV state and location).

The end state is either resumed AV operation (recovery) or suspended/terminated AV operation (retrieval). Once the object moves out of the road within a few seconds (e.g., 10 seconds or some other preset time threshold), the AV can self-recover from the event and resume on its course.

During the recovery or retrieval process, the AV secures its cabin against unauthorized users, for example, by locking doors and windows. In addition, the passenger receives communications via an onboard display or audible message, or via the passenger's personal device such as via text message or from the rideshare app. The communications keep the passenger informed and also permit the passenger to provide feedback such as information about the AV, confirmation about current exterior conditions or request to terminate the ride and exit the AV.

The recoverability of the AV is based on several parameters such as the type and severity of the non-nominal event, residual AV health, passenger confirmation, and the like. As mentioned above, a very brief stoppage due to an animal in the road is self-recoverable by the AV since it can proceed with driving as soon as the animal moves out of the path of the AV. Conversely, if the AV encounters an unexpected road closure along with stopped traffic in front and behind the AV (triggering event), self-recovery may not be possible.

Figure 5:
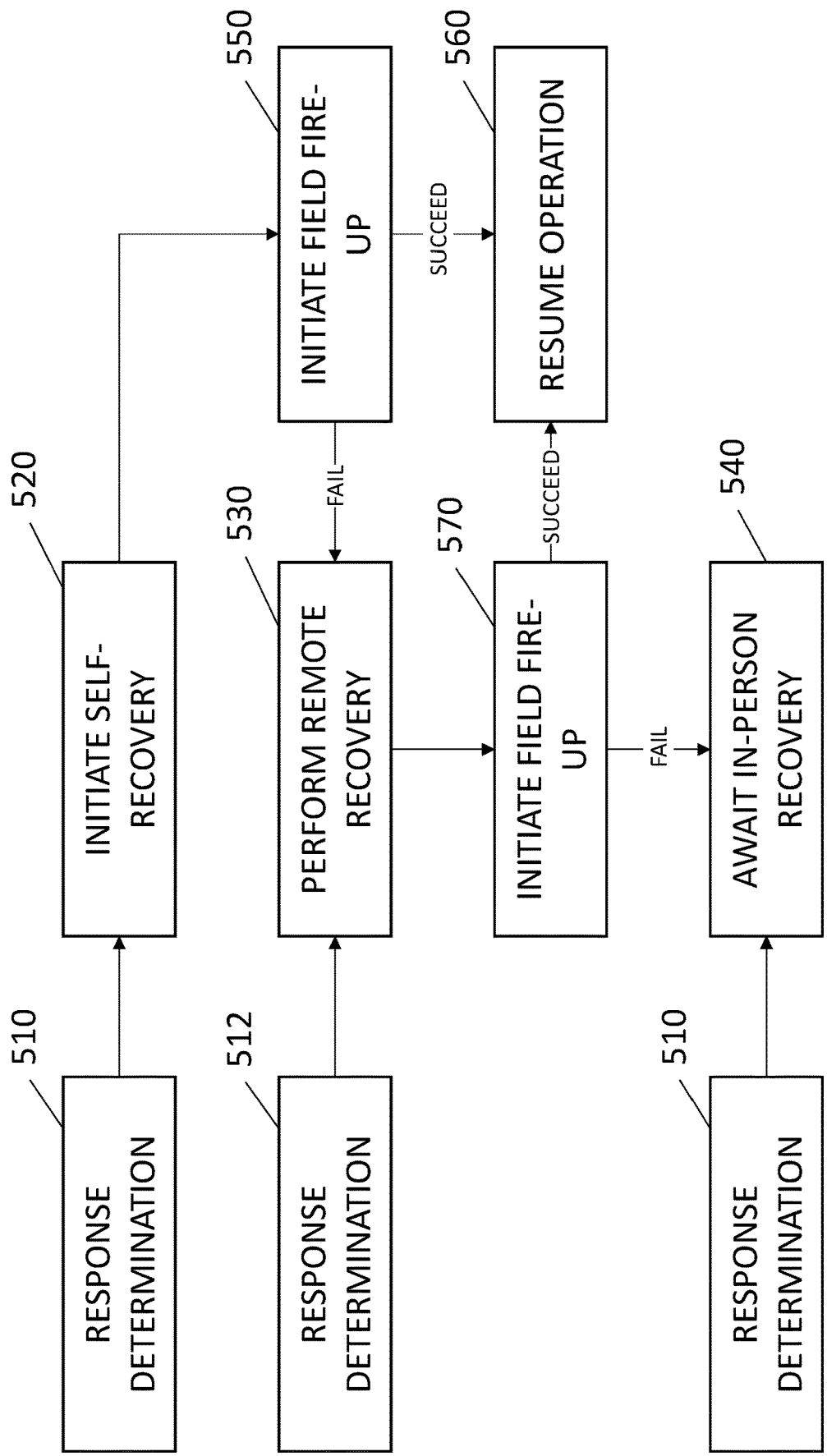
FIG. 5 is an example resolution escalation of recovery grades in accordance with some aspects of the present technology.

FIG. 5 illustrates an escalation of recovery and retrieval process levels as performed by the recovery and retrieval system. Depending on the triggering event, the recovery and retrieval process may immediately determine 510, 512, 514, 516 that any of self-recovery 520, remote recovery 530, in-person recovery 540 or tow retrieval 580 of the AV be initiated. Self-recovery 520 can be first initiated in cases of transient faults. Network or AV latency issues involving reset nodes, unlatch faults, and/or performing a power cycle of the AV are other types of triggering events from which the AV can self-recover. The AV can self-recover from transient events and latency issues that last less than about 10 seconds. Remote or manual intervention from the remote operations center is not needed by the AV to recover from these types of events.

For example, if there is pedestrian traffic in front of the AV, the AV makes a safe stop (e.g., becomes immobilized). If the pedestrian traffic is heavy and will take or is taking more than 10 second to clear, then this triggering event does not qualify as being transient and thus, is not self-recoverable by the AV.

To confirm self-recovery is completed, an automated safety and operations check 550 can be initiated and performed by the AV to validate success of the self-recovery 520. If it is successful, then the AV resumes operation 560. If that fails, then remote recovery 530 is initiated.

Alternatively, the data relating to the triggering event may cause the initiation of remote recovery 530. A remote operator evaluates and monitors data from the AV about the event (e.g., view of the pedestrian traffic and location) and the AV state. In the case of a latency event which has lasted for more than a preset time threshold (e.g., more than 10 seconds), the remote operations center can remotely reset the AV stack, unlatch the fault, restart ADSC, and/or perform a power cycle of the AV.

After completion of the remote recovery 530, an automated safety and operations check 570 of the AV can be initiated either by the remote operator or by the AV to validate success of the recovery process. If the check 570 is successful, the AV resumes operation 560. However, if the check 570 fails, the response is escalated to an in-person recovery 540. An operator arrives to the AV and performs necessary system checks and/or repairs for the AV to resume operation.

If a passenger is in the AV, then during the remote recovery, the remote operator can also send a communication to the passenger via the AV, via the rideshare app, or via the passenger's personal device to advise them of the temporary delay of the ride. If the passenger chooses to end the ride, then the remote operator can facilitate that process if it is safe for the passenger to exit the AV. Location, road and car traffic conditions may be used to determine whether exiting the AV is safe.

Examples of AV Recovery and Retrieval Based on Triggering Event

The following discussion relates to specific responses for different triggering events.

When a triggering event occurs, the AV status changes to a degraded state. The degraded state may be indicated by one or more of a value (letter or number), color or other signal for at-a-glance recognition and identification by monitoring systems and personnel. The event can be a system failure, error, or fault, causing the AV to send a notification to the remote operations center 106, 240 identifying the fault as well as the desired dynamic drawback task fallback maneuver (e.g., a pullover, secondary stop, or hard stop) and minimal risk condition location. The AV then performs the maneuver to achieve the minimal risk condition and remains in a stationary state while a diagnostic assessment is performed on the fault.

The assessment may involve comparing a signal level from a sensor system (or other fault identification) to predetermined levels associated with the possible response levels. Based on the assessment, an appropriate response is determined. For example, many people crossing in front of the AV such that the AV is prevented from moving for less than 10 seconds may be considered a low-level (grade 1) transient error that can be cleared during a self-recovery operation of the AV once the crossers are no longer blocking the AV. Accordingly, the appropriate response is determined to be a self-recovery. However, an extended transient error (e.g., greater than 10 seconds) caused by an extended sensor malfunction may be considered a grade 2 (or greater) error requiring one or more escalated levels of assistance: remote recovery, in-person recover, or retrieval.

For example, with reference to FIG. 5, if the fault is one that can be corrected via self-recovery, a self-recovery instruction can be sent from the remote operations center 106, 240 to the AV and the AV attempts self-recovery. A field fire-up is then performed to validate the success of the self-recovery. If successful, the AV then resumes operation; and if unsuccessful, the response is escalated to a remote recovery operation. If the field fire-up following the remote recovery is also unsuccessful, the response is then again escalated to an in-person recovery.

For some faults, a remote recovery may be performed first without attempting self-recovery. These types of faults may be recognized by the remote operations center as qualifying for remote recovery as the AV is being monitored. For other faults, in-person retrieval or tow retrieval may be the only option to resolve the fault. Therefore, time is not spent on attempting lower grades of recovery.

Similarly, the remote operations center 106, 240 may identify a fault through monitoring of the AVs and initiate or otherwise instruct an affected AV to perform a dynamic drawback task fallback maneuver to achieve a minimal risk condition. The remote operations center 106, 240 may then evaluate recoverability based on the fault and, if possible, initiate a remote recovery of the AV. Following the remote recovery, the AV performs a field fire-up and, if successful, resumes operation.

When a passenger wishes to prematurely end or stop a ride before the set drop-off location is reached, the passenger communicates that to the AV via the ridesharing app or inputs (e.g., buttons, voice commands, and the like) within the AV. The remote operations center 106, 240 may also be notified of the passenger's stop request either from the AV or the ridesharing app. The AV then performs the dynamic drawback task fallback maneuver and achieves then minimal risk condition. When stationary, the passenger exits the vehicle, and the AV enters a self-recovery response. During self-recovery, the AV ensures there are no faults (e.g., an open door) and waits for confirmation from the remote operations center 106, 240 to resume operation (e.g., move to a new location or remain at the current minimal risk condition location).

If faults are identified that cannot be addressed by self-recovery or remote recovery, the AV remains secured and immobilized for in-person recovery. The remote operations center 106, 240 may monitor the recovery operation using two-way communications with the passenger through the AV and/or cameras in the cabin of the AV.

The AV can also detect a collision through, for example, force and acceleration sensor systems. In the event of a detected collision, the AV performs the dynamic drawback task fallback maneuver and achieves the minimal risk condition, if possible (e.g., if damage to the AV does not prevent it from moving). An assessment of the collision is then performed for example with external cameras of the AV, comparison of the detected force/acceleration to thresholds (before and/or after the collision), and the like. An appropriate response is then determined based on the assessment of the collision.

For example, a collision may be detected when a person crossing through traffic inadvertently bumps into the AV. In these cases, only a minor force would be detected and camera review of the AV by the remote operations center 106,240 can confirm that there is no damage or other injury. The AV may then enter a self-recovery mode and if successfully completed, resume operation. An in-person recovery or tow retrieval response may be initiated for a significant collision causing damage to the AV or another vehicle. Further, should any injuries be suspected or detected based on the collision data, the AV and/or remote operations center 106,240 may trigger an emergency dispatch for first responders (e.g., law enforcement and/or first aid services).

Operational changes to the domain of the AV may also initiate a response procedure. These changes may include the detection of rain (e.g., detected by windshield wiper state or use for a predetermined time), fog (e.g., detected by a fog detector and/or confirmed as a true positive by camera inspection), changes to navigation or guidance maps, and the like. When an operation domain change is detected, the AV performs the dynamic drawback task fallback maneuver to achieve the minimal risk condition. The AV then begins a self-recovery operation to determine whether operation of the AV can continue. Should any faults continue to persist, or the operation domain changes become too significant, the response is escalated to a higher level of recovery or retrieval.

If the AV encounters unwanted public interactions or tampering (e.g., an unsecure cabin such as an open door or unlatched safety belt, steering wheel tampering when in an autonomous mode, or the like), the AV alerts the remote operations center 106, 240 and performs a dynamic drawback task fallback maneuver to move the AV away from any threats. Instead of performing a self-recovery, the response process begins with remote recovery. Upon confirmation that the threats are no longer present, the AV then resumes operation. During the event, the remote operations center 106, 240 can monitor the recovery. If the threat is maintained or increases, the remote operations center 106, 240 can escalate the response. If necessary, the remote operations center 106, 240 can further request an emergency dispatch or remotely honk a horn of the AV, flash headlights of the AV, or the like.

Should the AV be subject to a traffic stop by law enforcement, the AV notifies the remote operations center 106, 240 of the stop and performs a pullover dynamic drawback task fallback maneuver to achieve the minimal risk condition. During the traffic stop, the engine (or other locomotion source) of the AV is stopped by the AV itself or remotely by the remote operations center 106, 240. The AV and/or remote operations center 106, 240 may further roll down windows, unlock or open doors, or the like, if appropriate for the stop. The law enforcement officer (or other first responder) may remotely interact with the remote operations center 106, 240 via the AV connection to the remote operations center or via telephone. Following the traffic stop, the AV performs remote recovery to resume operation.

According to the above systems and methods, AV recovery and retrieval for driverless operations can minimize demand for on-site retrieval after a fault, thereby maximizing AV operational uptime. By having recovery and retrieval systems and processes in place, monitoring multiple AVs at the same time becomes more efficient as AVs needing assistance can be prioritized based on their type or level of degraded state.

Select Examples

Example 1 provides an autonomous vehicle (AV) recovery or retrieval method comprising transmitting information related to a status or a surrounding of the AV to a remote operations center; identifying the occurrence of a triggering event that immobilizes the AV based on the transmitted information; comparing the transmitted information to predetermined response criteria; based on the comparison, determining whether to initiate a self-recovery process of the AV by the AV or to perform a remote recovery process of the AV by the remote operations center; executing the self-recovery process or the remote recovery process based on the determination; confirming successful recovery of the AV by the remote operations center; and resuming operation of the AV.

Example 2 provides a method according to one or more of the preceding and/or following examples including after identifying the occurrence of the triggering event and prior to executing the self-recovery process or the remote recovery process, performing a dynamic driving task fallback maneuver to achieve a minimal risk condition; and securing a cabin of the AV.

Example 3 provides a method according to one or more of the preceding and/or following examples including providing communication between the remote operations center and a passenger of the AV.

Example 4 provides a method according to one or more of the preceding and/or following examples including determining to initiate the self-recovery process of the AV based on the comparison; executing the self-recovery process by the AV; performing a field fire-up of the AV after executing the self-recovery process; and confirming successful recovery of the AV based on an outcome of the field fire-up.

Example 5 provides a method according to one or more of the preceding and/or following examples including determining to initiate the self-recovery process of the AV based on the comparison; executing the self-recovery process by the AV; determining execution of the self-recovery process failed; and after determining execution of the self-recovery process failed, executing the remote recovery process.

Example 6 provides a method according to one or more of the preceding and/or following examples including determining execution of the remote recovery process failed; and after determining the execution of the remote recovery process failed, awaiting in-person recovery or retrieval.

Example 7 provides a method according to one or more of the preceding and/or following examples including determining to perform the remote recovery process based on the comparison; and executing the remote recovery process without first executing the self-recovery process.

Example 8 provides a method according to one or more of the preceding and/or following examples including wherein the event is a transient event lasting less than 10 seconds and the self-recovery process is executed.

Example 9 provides an autonomous vehicle (AV) recovery or retrieval system comprising: an AV; a sensor associated with the AV and configured to collect information related to a status or a surrounding of the AV; and a remote operations center comprising at least one processor and memory operated by a remote operator in communication with the autonomous vehicle, wherein the AV is configured to transmit the information related to the status or the surrounding of the AV from the sensor to the remote operations center, wherein the remote operations center is configured to do at least one of the following: identify the occurrence of a triggering event that immobilizes the AV based on the transmitted information; compare the transmitted information to predetermined response criteria; based on the comparison, determine whether to initiate a self-recovery process of the AV or to perform a remote recovery process of the AV; and confirm successful recovery of the AV following execution of the self-recovery process or the remote recovery process, wherein when the remote operations center determines to initiate the self-recovery process, the remote operations center is configured to instruct the AV to execute the self-recovery process and the AV is further configured to execute the self-recovery process, and wherein when the remote operations center determines to perform the remote recovery process, the remote operations center is further configured to execute the self-recovery process.

Example 10 provides a system according to one or more of the preceding and/or following examples, wherein after the remote operations center identifies the occurrence of the triggering event, and prior to executing the self-recovery process or the remote recovery process, the AV is further configured to: perform a dynamic driving task fallback maneuver to achieve a minimal risk condition, and secure a cabin of the AV.

Example 11 provides a system according to one or more of the preceding and/or following examples wherein the remote operations center is further configured to alert a passenger of the AV of the status of the AV following identification of the triggering event.

Example 12 provides a system according to one or more of the preceding and/or following examples, wherein after executing the self-recovery process, the AV is further configured to perform a field fire-up of the AV, and the remote operations center is further configured to confirm successful recovery of the AV based on an outcome of the field fire-up.

Example 13 provides a method according to one or more of the preceding and/or following examples, wherein when the remote operations center determines execution of the self-recovery process failed, the remote operations center is configured to execute the remote recovery process.

Example 14 provides a system according to one or more of the preceding and/or following examples, wherein when the remote operations center determines the remote recovery process failed, the AV is configured to await in-person recovery or retrieval.

Example 15 provides a system according to one or more of the preceding and/or following examples, wherein the remote operations center is configured to determine to perform the remote recovery process based on the comparison, and to execute the remote recovery process, without the AV first executing the self-recovery process.

Example 16 provides a system according to one or more of the preceding and/or following examples including, wherein when the event is a transient event lasting less than 10 seconds, the remote operations center is configured to determine to initiate the self-recovery process.

Example 17 provides an autonomous vehicle (AV) recovery or retrieval method comprising receiving information related to a status or a surrounding of an AV from the AV; identifying the occurrence of a triggering event that immobilizes the AV based on the transmitted information; comparing the transmitted information to predetermined response criteria; based on the comparison, instructing the AV to initiate a self-recovery process; and confirming successful recovery of the AV based on a field fire-up of the AV.

Example 18 provides a method according to one or more of the preceding and/or following examples further including alerting a passenger of the AV of the status of the AV following identification of the triggering event.

Example 19 provides a method according to one or more of the preceding and/or following examples further including determining execution of the self-recovery process failed; and after determining execution of the self-recovery process failed, executing a remote recovery process of the AV.

Example 20 provides a method according to one or more of the preceding and/or following examples wherein the event is a transient event lasting less than 10 seconds.

Example 21 provides a method according to one or more of the preceding and/or following examples wherein the AV is a driverless AV.

Example 22 provides a method according to one or more of the preceding and/or following examples wherein the AV is at least one AV of an AV fleet.

Example 23 provides a system according to one or more of the preceding and/or following examples wherein the AV is a driverless AV.

Example 24 provides a method according to one or more of the preceding and/or following examples wherein the AV is at least one AV of an AV fleet.

Variations and Implementations

It is to be understood that not necessarily all objects or advantages may be achieved in accordance with any implementation or example described herein. Thus, for instance, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits not shown in the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also notable that any of the specifications, dimensions, and relationships outlined herein have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Also note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, units, and elements of the drawings may be combined in various possible configurations, all of which are clearly within the broad scope of this Specification.

Further note that in this Specification, references to various features (e.g., elements, structures, modules, components, steps, operations, characteristics, etc.) included as an implementation or embodiment as in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An autonomous vehicle (AV) recovery or retrieval method comprising:
    transmitting information related to a status or a surrounding of the AV to a remote operations center;
    identifying the occurrence of a triggering event that immobilizes the AV based on the transmitted information;
    comparing the transmitted information to predetermined response criteria;
    based on the comparison, determining whether to initiate a self-recovery process of the AV by the AV or to perform a remote recovery process of the AV by the remote operations center;
    executing the self-recovery process, by the AV, based on the determination;
    determining execution of the self-recovery process failed;
    after determining execution of the self-recovery process failed, executing the remote recovery process;

confirming successful recovery of the AV by the remote operations center; and resuming operation of the AV.

2. The method of claim 1, further comprising:

after identifying the occurrence of the triggering event and prior to executing the self-recovery process or the remote recovery process:

performing a dynamic driving task fallback maneuver to achieve a minimal risk condition; and securing a cabin of the AV.

3. The method of claim 1, further comprising:

providing communication between the remote operations center and a passenger of the AV or first responder of the AV.

4. The method of claim 1, further comprising:

performing an automated safety and operations check of the AV after executing the self-recovery process, wherein determining execution of the self-recovery process failed is based on an outcome of the automated safety and operations check.

5. The method of claim 1, further comprising:

determining execution of the remote recovery process failed; and after determining the execution of the remote recovery process failed, awaiting in-person recovery or retrieval.

6. The method of claim 1, further comprising transmitting information related to the statuses or the surroundings of a plurality of AVs to the remote operations center, and identifying occurrences of triggering events that immobilize the plurality of AVs based on the transmitted information, and executing the self-recovery process or the remote recovery process for the plurality of AVs.

7. An autonomous vehicle (AV) recovery or retrieval system comprising:

an AV;

a sensor associated with the AV and configured to collect information related to a status or a surrounding of the AV; and a remote operations center comprising at least one processor and memory operated by a remote operator in communication with the autonomous vehicle, wherein the AV is configured to transmit the information related to the status or the surrounding of the AV from the sensor to the remote operations center, wherein the remote operations center is configured to:

identify the occurrence of a triggering event that immobilizes the AV based on the transmitted information;

compare the transmitted information to predetermined response criteria;

based on the comparison, determine whether to initiate a self-recovery process of the AV or to perform a remote recovery process of the AV;

determine to perform the remote recovery process based on the comparison;

execute the remote recovery process, without the AV first executing the self-recovery process; and confirm successful recovery of the AV following execution of the remote recovery process, wherein when the remote operations center determines to initiate the self-recovery process, the remote operations center is configured to instruct the AV to execute the self-recovery process and the AV is further configured to execute the self-recovery process, and wherein when the remote operations center determines to perform the remote recovery process, the remote operations center is further configured to execute the remote recovery process.

8. The system of claim 7, wherein after the remote operations center identifies the occurrence of the triggering event, and prior to executing the self-recovery process or the remote recovery process, the AV is further configured to:

perform a dynamic driving task fallback maneuver to achieve a minimal risk condition, and secure a cabin of the AV.

9. The system of claim 7, wherein the remote operations center is further configured to alert a passenger of the AV of the status of the AV following identification of the triggering event.

10. The system of claim 7, wherein when the remote operations center determines the remote recovery process failed, the AV is configured to await in-person recovery or retrieval.

11. The system of claim 7, comprising a plurality of AVs, wherein the remote operations center is configured to identify occurrences of triggering events that immobilize the plurality of AVs, and to instruct the plurality of AVs to execute the self-recovery process.

12. An autonomous vehicle (AV) recovery or retrieval method comprising:

receiving information related to a status or a surrounding of an AV from the AV;

identifying the occurrence of a triggering event that immobilizes the AV based on the transmitted information;

comparing the transmitted information to predetermined response criteria;

based on the comparison, instructing the AV to initiate a self-recovery process;

determining execution of the self-recovery process failed;

after determining execution of the self-recovery process failed, executing a remote recovery process of the AV; and confirming successful recovery of the AV based on an automated safety and operations check of the AV.

13. The method of claim 12, further comprising:

alerting a passenger of the AV of the status of the AV following identification of the triggering event.

14. The method of claim 12, comprising receiving information related to the status or the surrounding of a plurality of AVs from the plurality of AVs, and instructing the plurality of AVs to initiate the self-recovery process.

* * * * *